July 22, 1930.  E. L. BARRETT  1,770,905
ALTERNATING CURRENT MOTOR
Filed March 5, 1929   2 Sheets-Sheet 1

Inventor
Edward L. Barrett
By: Lindell Carter Carlson
Attys.

Inventor
Edward L. Barrett

Patented July 22, 1930

1,770,905

UNITED STATES PATENT OFFICE

EDWARD L. BARRETT, OF CHICAGO, ILLINOIS, ASSIGNOR TO UTAH RADIO PRODUCTS CO., OF CHICAGO, ILLINOIS, A CORPORATION OF ILLINOIS

ALTERNATING-CURRENT MOTOR

Application filed March 5, 1929. Serial No. 344,125.

My invention relates generally to alternating current motors of the type generally known as induction motors, and has as its aim the production of a new and improved motor of this type which is reversible for rotation in either direction.

Another object of this invention is to provide a motor of this type which is simple in construction and efficient in operation.

Figure 1:
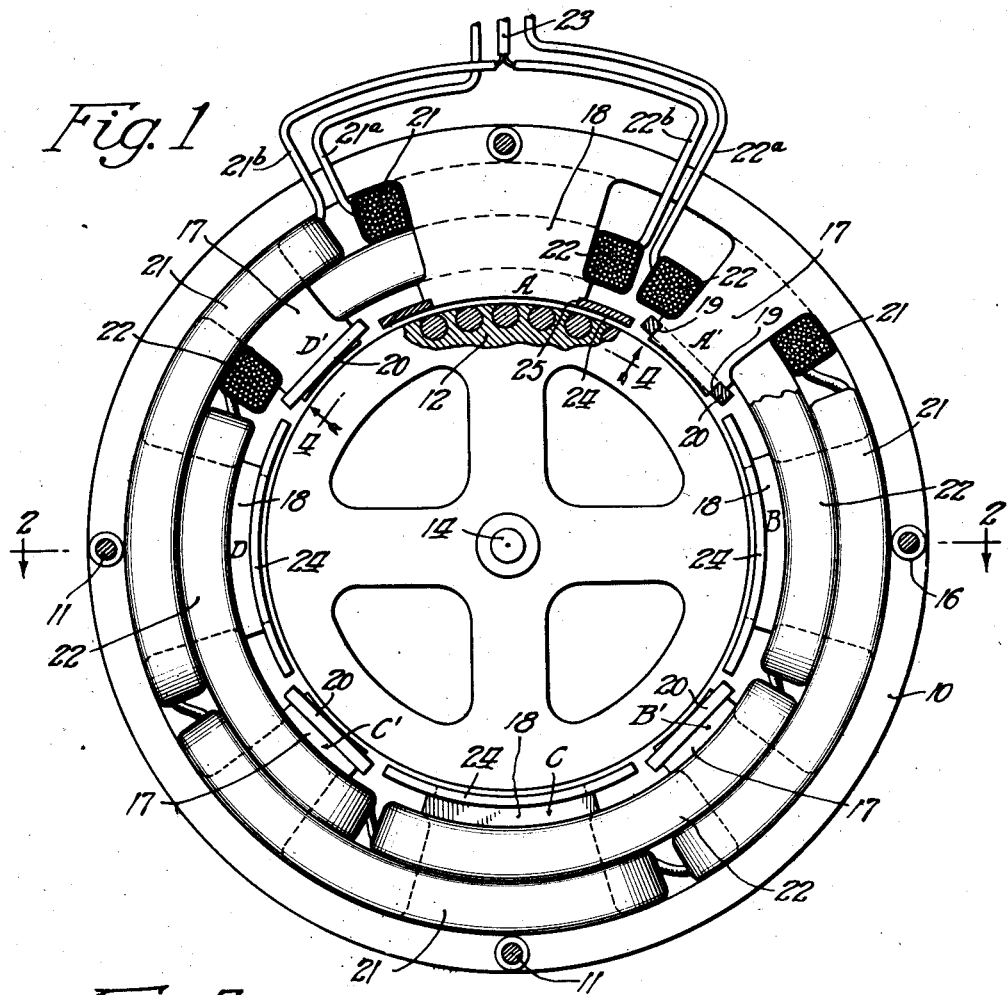
Figure 1 is a view partially in section and partially in end elevation of a motor embodying the features of the invention.

In accomplishing the objects of the invention I make use of the fact that by shading certain portions of the poles through which the magnetic field passes, the armature may be caused to rotate in one or the other direction. Therefore, by providing a series of shaded pole sections arranged alternately with a series of unshaded pole sections and by further providing a means for interchangeably energizing adjacent pole sections to form a complete pole unit, I may selectively cause rotation of the armature in either direction.

In the drawings I have illustrated the features of my invention as being embodied in an induction motor of the single phase type, the general elements of which are substantially well known. Thus, 10 represents generally a magnetic field structure or stator built up in the usual manner in the form of a laminated structure secured together by means of the bolts 11 or the like. The stator is in the form of a substantially annular ring within which an armature 12, of the "squirrel cage" type, is mounted for rotation. Suitable bearings 13, in which the armature shaft 14 of the armature 12 is journalled may, if desired, be formed as a part of the end plates 15 secured on either side of the stator by the bolts 11, and spaced laterally from the stator by spacing members 16.

In the common construction of a motor of this type, one or more pole units are provided which are arranged to be excited by a coil or other winding connected to a source of alternating current. The active face of the pole is divided into two sections, one of which is shaded for the purpose of producing a time lag in the alternating magnetism in the face of the shaded section behind that in the face of the unshaded section whereby a rotating magnetic field is produced. This rotating magnetic field travels in one direction or the other depending upon the location of the shaded section of the pole with respect to the unshaded section. The reversible feature of my improved motor is effected by providing a plurality of shaded pole sections 17 and a plurality of unshaded pole sections 18 arranged in alternating relation. The pole sections preferably extend radially of the magnetic field structure, and it has been found that increased efficiency is attained by forming the faces of the pole sections, which are to be shaded, of substantially less area than the faces of the remaining sections.

Figure 4:
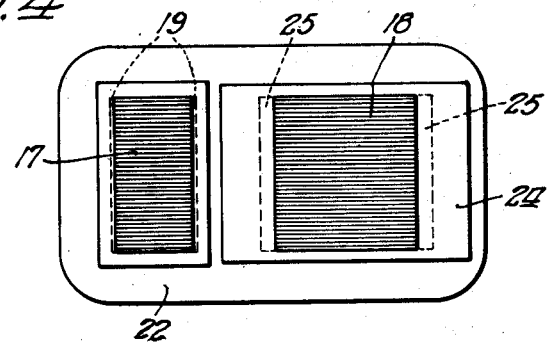
Fig. 4 is a detail view of the active faces of adjacent pole sections looking substantially in the directions of the arrows 4—4 of Fig. 1.
Figure 2:
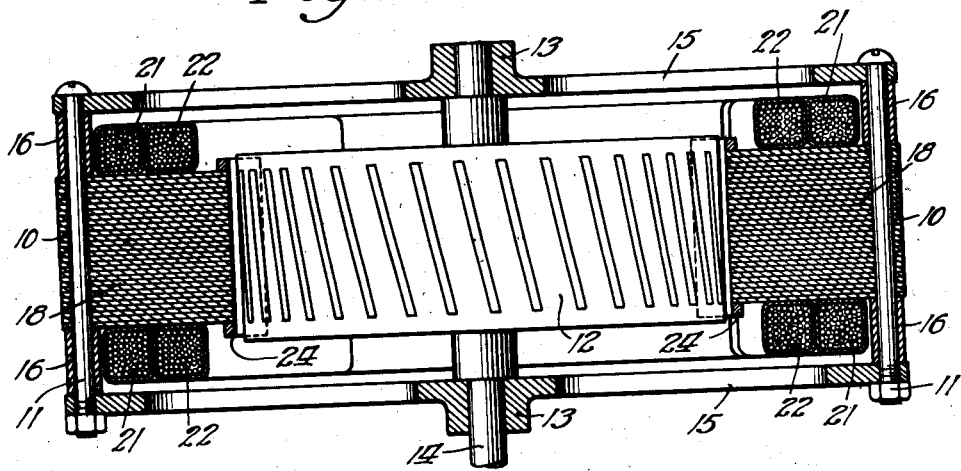
Fig. 2 is a transverse section through the motor taken substantially along the lines 2—2 of Fig. 1.

Shading of the sections 17 is accomplished in any suitable manner, as by forming a rabbeted groove 19 (Figs. 1 and 4) at opposite edges of the faces of the sections, which grooves snugly receive a suitably-formed centrally apertured disc or slug 20 of a copper or similar good conductor.

It will be understood that two adjacent pole sections, that is, a shaded and an unshaded pole section are energized to form a complete pole unit. Thus, by providing two separate sets of coil windings 21 and 22, one of which sets embraces or encircles the unshaded pole sections and the next adjacent shaded pole section on one side of the unshaded sections, and the other of which sets embraces the same unshaded pole sections and the next adjacent shaded pole section on the opposite side of the unshaded sections, I may, by selectively energizing one or the other of said sets of windings, provide an energized pole unit which will effect rotation of the armature in one direction or the other.

To this end, (see Fig. 1) each coil winding 21 in the set is of such size that it embraces or encircles one of the unshaded pole sections 18 and the adjacent shaded pole section 17, which is shown herein as being the shaded section positioned in a clockwise direction from the unshaded pole sections 18. The ends of the coils fit relatively snugly in the spaces or gaps which separate the pole sections and the coils may be arcuately shaped in the usual manner. Likewise, each coil winding 22 in the second set embraces a pair of adjacent pole sections but differ from the first set of windings in that the unshaded pole sections 18 are combined with the shaded pole sections 17 positioned on the opposite or counterclockwise sides of the unshaded sections. The coils 22 lie adjacent the coils 21 and the ends of the coil windings, in each set, are positioned in the inter-pole-section spaces which are spanned by the coils of the other set. The windings of each set of coils 21 and 22 are in series and the successive windings comprising each set are reversed with respect to each other in the customary manner. Consequently the windings may be said to group the unshaded and shaded poles in pairs which pairs, when the windings are selectively connected with a source of current, are energized with the same polarity.

Figure 3:
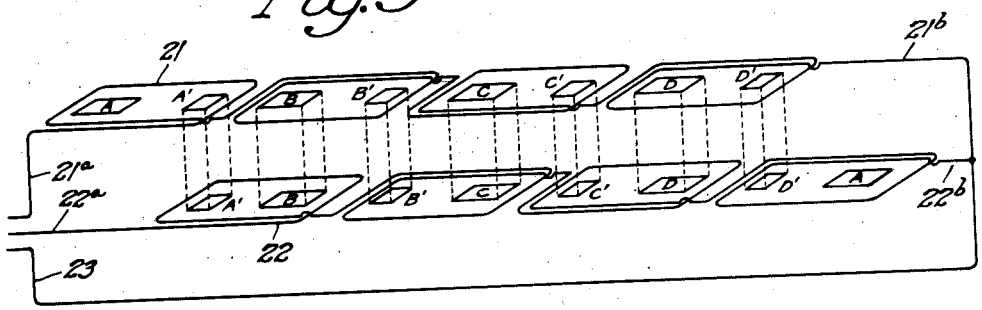
Fig. 3 is a diagrammatic illustration of the circuits of the motor.

The above construction is illustrated diagrammatically in Fig. 3 in which A, B, C and D represent the unshaded pole sections, and A', B', C' and D' designate the shaded pole sections. The windings 21 embrace the pole sections A, A'; B, B'; C, C'; and D, D' to form the pole units for effecting movement of the armature in one direction, while the windings 22 embrace the pole sections A' B; B' C; C' D; and D' A to form the pole units for effecting rotation in the opposite direction. Leads 21ª, 21ᵇ, and 22ª, 22ᵇ are provided for connecting the coil windings 21, 22 respectively with a suitable source of alternating current (not shown). If desired, one lead from each of the coil windings, such as the leads 21ᵇ and 22ᵇ, may be connected to form a common lead 23.

It will be seen, therefore, that by merely connecting the leads 21ª and 23 with a suitable source of alternating current, the coil windings 21 may be energized, whereby the armature will be rotated in one direction. Similarly by disconnecting the lead 21ª and connecting the lead 22ª, the current flow will be through the coil windings 22 and the armature will be rotated in the opposite direction.

It has been found, in a motor of this type, that the efficiency of the motor is increased by increasing the area of each of the unshaded pole sections 18. Each of these sections, therefore, carries an auxiliary face plate 24 preferably formed of the same material as the pole section and fitted thereon in rabbeted grooves 25 in substantially the same manner as was employed in mounting the shading discs 20 on the pole sections 17. The face plates 24, however, are preferably flush with the active face of the pole sections 18, and are arcuately shaped to conform to the curvature of said face.

It will be opparent from the foregoing that I have provided an alternating current motor which is exceedingly simple in operation and which may be readily caused to rotate in either direction by merely connecting one or another of the leads with the source of alternating current.

While I have illustrated in this embodiment a four pole motor having four shaded and four unshaded pole sections, it will be apparent, to any one skilled in the art, that the number of poles may be varied. It is, however, deemed essential that the pole units be tri-sectional; by which I mean that certain adjacent shaded and unshaded pole sections are capable of being designated in sets of three sections alternately arranged. Thus, each tri-sectional pole unit may be said to comprise either an unshaded pole section having a shaded pole section on opposite sides thereof, or a shaded pole section having an unshaded pole section on opposite sides.

I claim as my invention:

1. A reversible alternating-current motor comprising in combination, a magnetic field structure having a plurality of permanently shaded and unshaded pole sections thereon arranged alternately with respect to each other, an armature mounted for induced rotation in said structure, means for energizing adjacent shaded and unshaded pole sections in pairs to provide shaded energized pole units for inducing rotation of said armature in one direction, and means for energizing adjacent shaded and unshaded pole sections in an opposite arrangement of pairs to provide oppositely shaded energized pole units for inducing rotation of the armature in the opposite direction.

2. A reversible alternating current motor having a rotatably mounted armature, a magnetic member positioned with the active face thereof adjacent said armature, said magnetic member including an unshaded section and a pair of ring short circuited shaded sections positioned on opposite sides of said unshaded section, means adapted to be connected to a current supply for effecting the energization of said unshaded section together with one of said shaded sections to rotate the armature in one direction, and other means adapted to be connected to said current supply for effecting the energization of said unshaded section with the other one of said shaded sections.

3. In an alternating current motor, a magnetic field structure divided into three substantially adjacent sections, certain of said sections being shaded and arranged in alternate relation with respect to the remaining sections, an energizing winding embracing the intermediate section and one of the outer sections, and a second energizing winding embracing the intermediate section and the other of said outer sections.

4. In a device of the character described, a tri-sectional pole unit comprising permanently shaded and unshaded pole sections arranged in alternating relation and means for energizing said sections in pairs, each pair comprising a shaded and an unshaded section.

5. In an alternating current motor, the combination of a magnetic field structure having a plurality of shaded and unshaded pole sections thereon arranged in alternating relation, and means for interchangeably energizing with the same polarity each of said unshaded pole sections and either one of the next adjacent shaded pole sections.

6. An alternating current motor comprising, in combination, a rotatable armature, a stator in the form of a ring shaped structure within which said armature rotates, said stator including a plurality of pole sections extending substantially radially of said armature, shading means on alternate pole sections, a winding embracing successive pairs of shaded and unshaded pole sections, and a second winding also embracing successive pairs of adjacent pole sections and arranged to embrace different pairs of pole sections from those embraced by the first mentioned winding.

7. In a reversible motor of the character described, the combination of an armature and means for inducing rotation of said armature in either direction, said means including a plurality of pole sections arranged about said armature, means for shading alternate pole sections, means for pairing and energizing shaded with unshaded pole sections arranged when energized to produce rotation of said armature in one direction, and means for pairing and energizing the same unshaded pole sections with different shaded pole sections arranged when energized to produce rotation of said armature in the opposite direction.

8. In a device of the character described, the combination of a rotatable armature and means for inducing rotation of said armature in either direction, said means comprising a plurality of shaded and unshaded pole sections, a series of coil windings each embracing a shaded and an unshaded pole section and adapted when energized to produce a magnetic field rotating in one direction, and a second series of coil windings, each embracing a shaded and an unshaded pole section for producing a magnetic field rotating in the opposite direction upon energization thereof.

9. A magnetic field structure for an alternating current motor comprising a member having a plurality of pole sections, shading means on alternate pole sections, and means for combining adjacent shaded and unshaded pole sections to form a pole unit comprising an energizing winding encircling each one of said unshaded pole sections and the shaded pole section next adjacent one side thereof, and a second energizing winding encircling each of said unshaded pole sections and the shaded pole section next adjacent the opposite side thereof.

10. A reversible alternating current motor having, in combination, a rotor, a stator comprising a plurality of unshaded and permanently shaded pole sections, and means for driving said rotor comprisng a winding arranged when energized to excite the sections in groups to drive said rotor in one direction, and a second winding arranged when energized to excite the sections in different groups to drive said rotor in the opposite direction.

11. In an alternating current motor, a field structure comprising a series of pole sections, permanently short circuited electrical conductors surrounding alternate sections, an energizer embracing each shaded section and the next adjacent unshaded section one one side thereof in pairs, and a second energizer embracing each shaded section and the next adjacent unshaded section on the opposite side thereof in pairs.

12. The combination of a rotor and a stator having a plurality of unshaded and permanently shaded poles in alternation, and means to selectively energize with the same polarity the unshaded poles and the shaded poles on the one side thereof or the unshaded poles and the shaded poles on the opposite side thereof.

13. In a stator for a motor, a plurality of inwardly extending main poles consecutively alternating with inwardly extending shaded poles; and two selectively operable means for imparting opposite magnetization to the consecutive main poles, the said means being respectively arranged for imparting opposite polarities to each of the shaded poles between which a given main pole is disposed.

In testimony whereof, I have hereunto affixed my signature.

EDWARD L. BARRETT.